United States Patent
Carlsson

(10) Patent No.: US 6,899,074 B1
(45) Date of Patent: May 31, 2005

(54) TEMPERATURE REGULATING SYSTEM

(75) Inventor: Sven-Ake Carlsson, Eskilstuna (SE)

(73) Assignee: Volvo Construction Equipment Components AB, Eskilstuna (SE)

( * ) Notice: Subject to any disclaimer, the term of this patent is extended or adjusted under 35 U.S.C. 154(b) by 23 days.

(21) Appl. No.: 10/604,656

(22) Filed: Aug. 7, 2003

Related U.S. Application Data

(63) Continuation-in-part of application No. PCT/SE02/00010, filed on Jan. 4, 2002.

(30) Foreign Application Priority Data

Feb. 7, 2001 (SE) .............................................. 0100386

(51) Int. Cl.[7] ................................................. F01M 1/00
(52) U.S. Cl. ............................. 123/196 AB; 123/41.31; 184/6.22; 184/104.1
(58) Field of Search .......................... 123/41.31, 41.33, 123/196 R, 196 AB; 184/6.13, 6.22, 104.1

(56) References Cited

U.S. PATENT DOCUMENTS 6,457,564 B1 * 10/2002 Damm et al. ................. 184/6.5

FOREIGN PATENT DOCUMENTS

| DE | 4140667 A1 | 6/1993 |
|---|---|---|
| WO | WO 9943931 A1 | 9/1999 |

* cited by examiner

Primary Examiner—Noah P. Kamen
(74) Attorney, Agent, or Firm—Novak Druce & Quigg, LLP

(57) ABSTRACT

Method and arrangement for providing a temperature regulating system (1) in a vehicle. The system includes an hydraulic arrangement (6) that is adapted to provide components intended for rotation belonging to a gearbox (5) of the vehicle and at least one of the axles (2, 3) of the vehicle with hydraulic oil from the same container (7). The system also has an arrangement (22) for regulating the temperature of the oil in the hydraulic arrangement (6) via a heat exchanger unit (21). The temperature regulating arrangement (22) is also adapted to cool the engine (4) of the vehicle.

13 Claims, 2 Drawing Sheets

TEMPERATURE REGULATING SYSTEM

CROSS REFERENCE TO RELATED APPLICATIONS

This present application is a continuation-in-part patent application of International Application No. PCT/SE02/00010 filed 4 Jan. 2002 which was published in English pursuant to Article 21(2) of the Patent Cooperation Treaty, and which claims priority to Swedish Application No. 0100386-2 filed 7 Feb. 2001. Both applications are expressly incorporated herein by reference in their entireties.

BACKGROUND OF INVENTION

1. Field of the Invention

The present invention relates to a temperature regulating system for a vehicle. The invention will be described below for a case where the temperature regulating system is installed in a construction vehicle in the form of a wheel loader. This is a preferred, but in no way limiting, application of the invention.

An example of an application of the temperature regulating system is for heating/cooling a lubricating oil for the gearbox of the vehicle. This comprises (includes, but is not limited to) a number of interacting gear wheels. In order to reduce wear of these components during operation, they are lubricated with the oil. The lubricating oil functions worse when it is cold. It is therefore desirable, for example when the vehicle is cold-started, for it to be possible to heat the oil. After a period of operation of the gearbox, there is also a risk of the lubricating oil becoming so hot that the gearbox or the hydraulic system will be damaged. It is then desirable for it to be possible to cool the lubricating oil.

2. Background of the Invention

WO 99/43931 describes a temperature regulating system for a wheel loader. The system comprises a first hydraulic arrangement for providing the hydraulic cylinders of the vehicle, which drive the shovel of the vehicle, with hydraulic oil. The system also comprises an arrangement for cooling the internal combustion engine of the vehicle. The cooling arrangement is connected to the hydraulic arrangement via a first heat exchanger. A charge air cooler for the turbo compressor of the vehicle is located up-stream of the heat exchanger in the flow direction of the coolant in the coolant circuit.

This construction is advantageous, for example, when the internal combustion engine is cold-started. The charge air cooler cools the charge air as soon as the internal combustion engine is started, which results in rapid heating up of the hydraulic oil via the first heat exchanger.

During operation of the shovel, the hydraulic oil may become too hot to function effectively as a working fluid. The temperature regulating system is adapted to sense this and, in such a case, the oil is cooled. This is brought about by a further heat exchanger, namely the radiator of the vehicle, being arranged in the coolant circuit. In such a case, the coolant is cooled in this further heat exchanger.

WO 99/43931 also describes how the temperature regulating system can comprise a second hydraulic arrangement for providing the transmission of the vehicle with oil. The cooling arrangement is then connected to this second hydraulic arrangement via a second heat exchanger.

WO 99/43931 further describes how the temperature regulating system can comprise a third hydraulic arrangement for providing the axles of the vehicle with oil. The cooling arrangement is then connected to this third hydraulic arrangement via a third heat exchanger.

In different operating states, the various parts which require a supply of hydraulic oil are loaded to different degrees. One example of an operating state is short cycle load, in which the transmission of the vehicle is hot and the axles are cold. Another example of an operating state is transport driving, in which the axles of the vehicle are hot and the transmission is cold. When the operating state is changed, it is necessary to heat up the hydraulic oil to be supplied to the part used in the intended operating state before it will function optimally. It would therefore be desirable to produce a vehicle with improved energy utilization.

SUMMARY OF INVENTION

An objective of the invention is to produce a temperature regulating system for a vehicle, which affords opportunities for more effective operation of the vehicle with regard to energy efficiency. Another objective is to bring about reduced wear of components of the vehicle intended for rotation, which are cooled and/or lubricated. A further objective is that the temperature regulating system should afford opportunities for more cost-effective manufacture of the vehicle. The temperature regulating system is moreover intended to afford opportunities for simple and time-efficient maintenance.

These objectives are achieved by virtue of the fact that the temperature regulating system comprises a hydraulic arrangement that is adapted to provide components intended for rotation located in a gearbox of the vehicle and in at least one of the axles of the vehicle with hydraulic oil from the same container. Examples of such rotating components would include gear wheels, axles and disks in brakes.

By virtue of the fact that the same hydraulic oil is used for heating/cooling and lubricating the rotating components of the gearbox and the axles, the hydraulic oil which is supplied, when the operating state is changed, to one of the systems that that has been essentially unloaded during the first operating state will already be hot at the start of the following operating state.

When required, it is of course also possible to use this mode of arrangement to cool a part which has heated up during operation by cooling the oil which is supplied to the part.

According to traditional design, each of the hydraulic arrangements for the axles, the gearbox and the hydraulic cylinders comprised a separate hydraulic tank. By virtue of the fact that, according to the present invention, use is made of one and the same container for the hydraulic oil for both the gearbox and the axles of the vehicle, the number of hydraulic tanks previously required can now be reduced to just one.

As the gearbox and the axles are provided with oil from the same tank, a smaller quantity of hydraulic oil is required overall. Furthermore, opportunities are afforded for a more space-efficient hydraulic arrangement. Because of the smaller required quantity of hydraulic oil, the invention is also advantageous from an environmental point of view. Still further, because use is made of only one container, the hydraulic oil is topped up/changed in only one place, which is time-efficient.

According to one embodiment of the invention, at least one space previously used for housing one of the components is adapted for a dry sump. In this way, power losses related to the fact that components rotate in an oil bath can be reduced. These losses are usually referred to as drag losses.

According to another embodiment of the invention, the hydraulic arrangement comprises at least one pump (a first pump) for pumping oil from the container to the gearbox and to the vehicle axle. The hydraulic arrangement comprises at least two additional pumps (second pumps), namely one for suction of oil from the gearbox and one for suction of oil from a concerned vehicle axle. Because of the presence of the second pumps, which are known as drainage pumps, the gearbox and the axle will each be drained of oil irrespective of any relative difference in their oil quantities.

According to yet another embodiment of the invention, each of the second pumps used for removing oil from the gearbox and the axle, respectively, has a pump capacity that is at least the same as, and preferably greater than, that of the first pump for supplying oil connected to the gearbox and to the axle. Therefore, with suitable selection of the size of the second pumps and the positioning and operation thereof, when hydraulic oil is supplied to, for example, the rear axle of the vehicle, the rear axle box will be continuously drained of the hydraulic oil supplied and no build-up or reservoiring of the lubricant is allowed.

According to another embodiment of the invention, the reservoir container is located apart from the lubricated rotating components forming part of the axle and from the rotating components forming part of the gearbox. In this way, power losses related to the fact that components rotate in an oil bath can be reduced. Again, these losses are usually referred to as drag losses.

According to another inventive embodiment, the temperature regulating system comprises an arrangement for regulating the temperature of the oil in the hydraulic arrangement via a heat exchanger unit. This temperature regulating arrangement is also adapted to cool the engine of the vehicle. One advantage of this arrangement is realized when cold starts take place. During start-up of the vehicle, the engine is started with the gearbox in neutral. This results in the engine heating up more rapidly than the gearbox. Because of the provided heat exchanger unit, heat is transferred from the coolant of the engine to the hydraulic oil and in this way the oil is heated-up more rapidly.

BRIEF DESCRIPTION OF DRAWINGS

The invention will be described in greater detail below with reference to the exemplary embodiment shown in the accompanying drawings in which.

DETAILED DESCRIPTION

Figure 1:
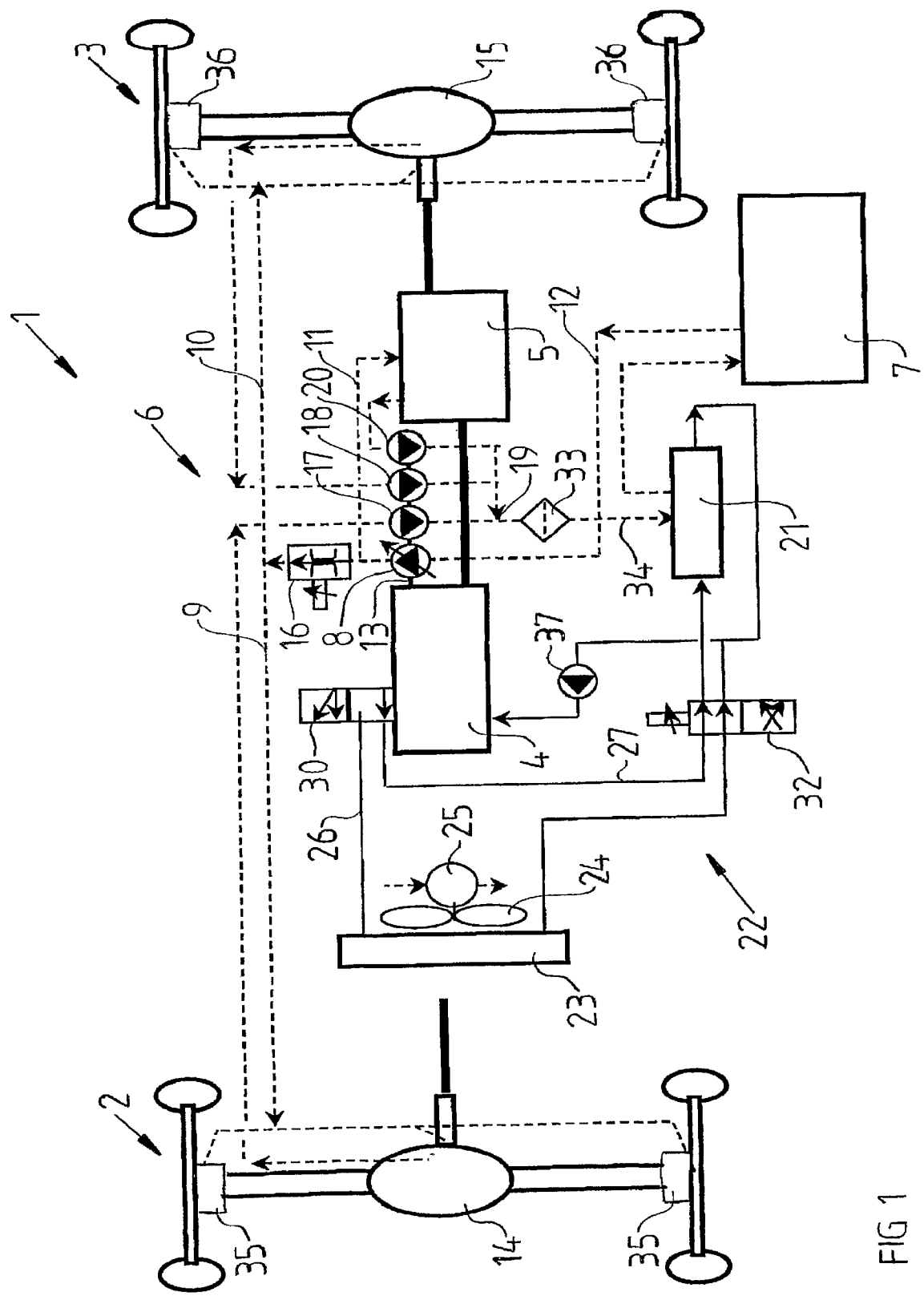
FIG. 1 is a schematic view of an hydraulic oil and coolant diagram exemplifying one embodiment of a temperature regulating system configured according to teachings of the present invention(s).

FIG. 1 shows an hydraulic oil and coolant diagram for a temperature regulating system 1 for a vehicle exemplarily in the form of a wheel loader. The wheel loader comprises a rear axle 2, a front axle 3, a diesel engine 4 and a gearbox 5 connected to the engine. Connected between the gearbox 5 and the front and rear axles is a transfer gearbox (not shown) for distributing the power to the rear axle and the front axle.

In this context, rear axle or front axle 2, 3 is used to refer to the whole mechanical construction that transmits driving power to driving wheels on the right and the left side of the axle. The rear axle 2 comprises a rear axle box which encloses a central gear 14, by means of which the driving power is turned through 90°. From the central gear, the driving power is transmitted via driving axles to the driving wheels. The central gear comprises a pinion, a drive gear and a differential gear. A hub reduction gear in the form of a planetary gear (not shown) is also arranged at each wheel. By means of the hub reduction gear, a reduction of the speed to the driving wheels is brought about. The gear wheels forming part of the central gear and the hub reduction gear require lubrication. The rear axle box also encloses a brake 35 arranged at respective wheels. The brake is what is known as a wet brake and comprises a set of brake disks enclosed in a housing. The disks are cooled by an oil.

The temperature regulating system 1 comprises a hydraulic arrangement 6 which is adapted to provide components intended for rotation belonging to the axles 2, 3 of the vehicle with hydraulic oil from a container 7 via an hydraulic oil circuit. The expression "components intended for rotation" exemplarily refers to such things as the gear wheels in the central gear 14, 15, the hub reduction gear, the disks in the brakes 35, 36, and the like. In other words, the same oil is used for lubricating the gear wheels and cooling the disks. In FIG. 1, pipes for the hydraulic oil are illustrated by broken lines.

The tasks of the oil are to lubricate bearings and tooth engagements, to create friction in multiple disk clutches and multiple disk brakes and to act as a transfer for heat. The hydraulic oil used is therefore intended for, on the one hand, temperature regulation; that is to say heating and cooling, and on the other hand lubrication of rotating components.

A first part 9 of the hydraulic oil circuit is connected to the rear axle 2, and a second part 10 of the hydraulic oil circuit is connected to the front axle 3.

The gearbox 5 comprises a number of shafts. Arranged on each of the shafts is a number of gear wheels. The gear wheels are engaged and disengaged depending on the gear selected. The hydraulic arrangement 6 is also adapted to provide the gear wheels in the gearbox 5 of the vehicle with hydraulic oil from the container 7. A third part 11 of the hydraulic oil circuit is for these reasons connected to the gearbox 5. The hydraulic oil can also be provided to disks of (clutch(es)) of the gearbox 5.

The hydraulic arrangement 6 also includes the container 7 for the hydraulic oil and a first pump 8 for suctioning of the oil, via a pipe 12, common to the hydraulic oil circuit parts 9, 10, 11, from the container 7. The common pipe 12 divides into the hydraulic oil circuit parts 9, 10, 11 for the gearbox 5 and the axles 2, 3. A flow valve 16 is arranged on the pipe 12 in order to distribute the oil to the axles.

The hydraulic arrangement 6 also comprises two drainage pumps 17, 18 for pumping the oil supplied to the rear axle 2 and the front axle 3 back to the container 7, respectively. The pipes from the drainage pumps 17, 18 are combined at a point 19.

The hydraulic arrangement also comprises a drainage pump 20 for pumping the oil supplied to the gearbox 5 back to the container 7. A pipe from the drainage pump 20 is combined with the pipes from the drainage pumps 17, 18 of the axles at the point 19. A common pipe 34 leads from the point 19 where the pipes are combined to a heat exchanger unit 21.

A cleaning unit in the form of a filter, or a strainer, 33 is connected between the axles 2, 3 and the container 7. The filter 33 is exemplarily arranged on the pipe 34 between the drainage pumps 17, 18, 20 and the heat exchanger unit 21. In the event of damage in one of the axles, undesirable particles will be filtered out and will therefore not find their way into, and foul the hydraulic oil container 7.

Each of the pumps 8, 17, 18, 20 is adapted to provide a flow which corresponds to the engine speed. In this embodiment, the pumps 8, 17, 18, 20 are therefore arranged on a crankshaft 13 from the diesel engine 4.

The temperature regulating system 1 comprises an arrangement 22 for regulating the temperature of the oil in the hydraulic arrangement 6 via the heat exchanger unit 21. The temperature regulating arrangement 22 is also adapted to cool the engine 4 of the vehicle. To be precise, the heat exchanger unit 21 is adapted for heat exchange between the oil pumped from the gearbox 5 and the axles 2, 3 and coolant from the diesel engine 4. The heat exchanger unit 21 is arranged upstream of the container 7 in the flow direction of the hydraulic oil. In FIG. 1, pipes for the coolant are illustrated by solid lines.

The temperature regulating arrangement 22 comprises a coolant pump 37 which pumps the coolant in a coolant circuit. To be precise, the coolant is pumped through cooling ducts in the engine block and cylinder head of the engine 4 and, in a first part 26 of the coolant circuit, on to a radiator 23. A fan 24, which is driven by a separate hydraulic motor 25, blows air onto the radiator 23, and the coolant is thus cooled in a known manner. The coolant is pumped from the radiator 23 to the heat exchanger unit 21 and then back to the engine 4. A second part 27 of the coolant circuit is connected in parallel with the radiator 23. When the coolant is led through this second part 27, it is therefore not cooled by the radiator 23. The temperature regulating arrangement comprises a directional valve 30 for directing the coolant to the coolant circuit parts 26, 27.

Figure 2:
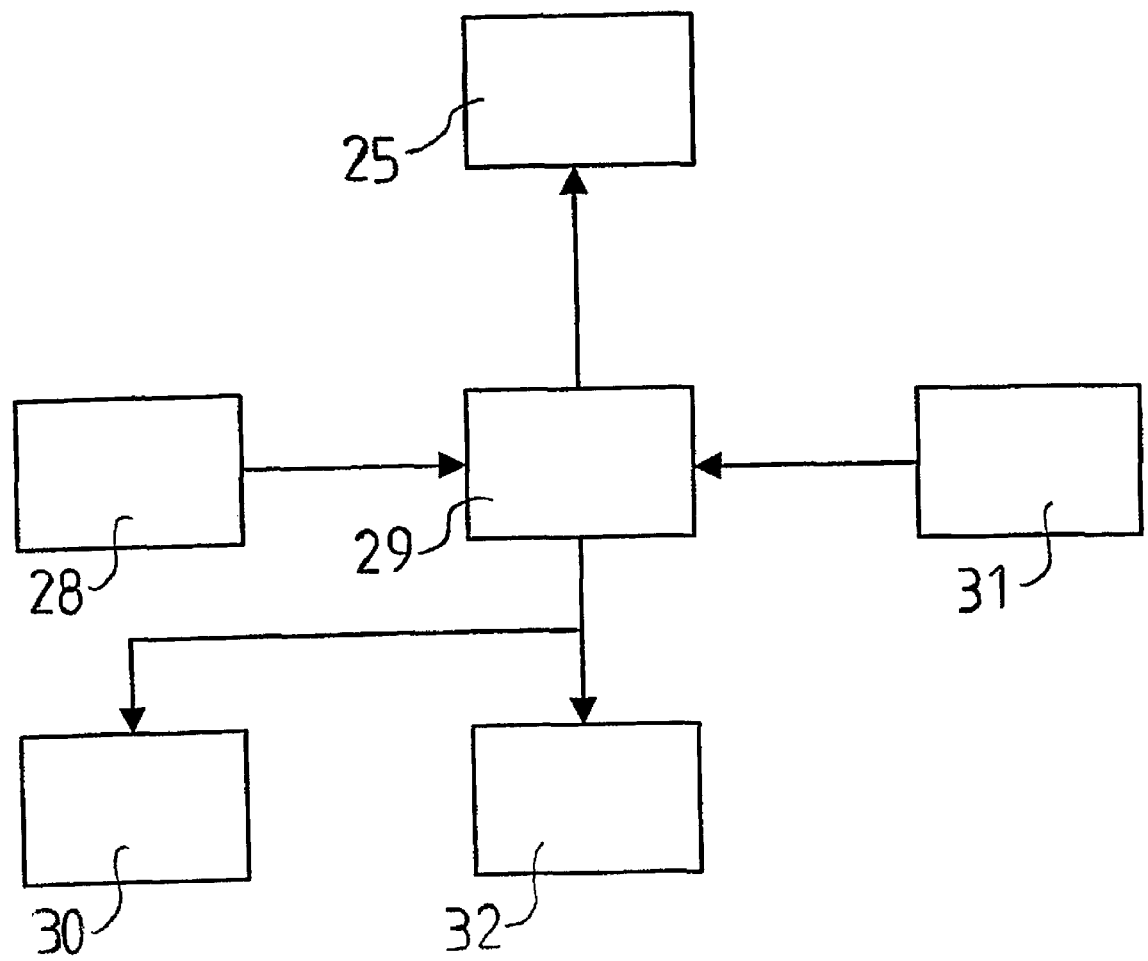
FIG. 2 is a diagrammatic view of a control arrangement configured according to the teachings of the invention(s).

The temperature regulating system 1 comprises a sensor 28, (see FIG. 2), for sensing the temperature of the oil and a control unit 29 connected to the sensor. The control unit 29 is also connected to the directional valve 30 for controlling the configuration thereof. The temperature regulating arrangement is adapted to cool or heat the oil depending on the sensed oil temperature. The temperature regulating system also comprises a sensor 31 for sensing the temperature of the coolant of the engine and another directional valve 32 adapted to direct the coolant into a pipe to the heat exchanger unit 21, or there beyond. The sensor 31 and the directional valve 32 are connected to the control unit 29. The control unit 29 itself comprises a memory, that includes software segments, for controlling the hydraulic motor 25 and the directional valves 30, 32 depending on the temperatures of the hydraulic oil and the coolant sensed by the sensors 28 and, 31, respectively.

When the vehicle is cold-started, the hydraulic oil is cold. The engine coolant is led through the pipe 27 parallel to, but by-passing the radiator 23 to the heat exchanger unit 21 in order to heat the oil. At a predetermined oil temperature, for example 65° C., the directional valve 30 is switched over so that coolant is led through the radiator 23. Where it is then cooled down. When the directional valve 32 is set in this a position, the liquid cooled in the radiator 23 by-passes the heat exchanger unit 21; that is to say, not through it. At a second predetermined oil temperature, for example 87° C., the directional valve 32 is switched over so that the liquid cooled in the radiator 23 is led through the heat exchanger unit 21. The oil will then be cooled. In other words, when the hydraulic oil has reached a suitable working temperature, the coolant will dissipate excess heat away from the hydraulic oil for the purpose of keeping the hydraulic oil temperature at a suitable level.

The oil temperature sensor 28 is, for example, arranged in the hydraulic oil container 7. The coolant sensor 31 is, for example, arranged in the radiator 23.

The hydraulic oil container 7 is positioned apart from both the axles 2, 3 and the gearbox 5, and the hydraulic oil is pumped to these parts. Traditionally, the rear axle box had served as a container for the hydraulic oil. The gear wheels in a traditionally-designed central gear then rotated in an oil bath. By virtue of the present invention's separation away of the hydraulic oil container 7, the power losses previously associated with drag or splash losses, which arose when components rotated in the oil bath, are reduced or eliminated. To this end, the system is of the dry sump type. That is, the oil is now sprayed, injected or sprinkled, or eliminated onto the components which require lubrication or cooling. The oil is then subsequently sucked away from the space concerned, such as the axle box and the gearbox casing avoiding the reservoiring of lubricant and the associated energy losses of components operating therein.

To this end, the system comprises spraying means, which can consist of a nozzle or another opening connected to the hydraulic oil supply pipe. The system also comprises means for removing the oil from the receiving space. Such oil removal is by means of a pump. The oil removal means are adapted essentially to suck the space dry. This means that no oil, or only a small quantity of oil, is present in an inactive state in the space; that is to say, in the bottom of the space. Moreover, since the axle box will not serve as a container for the hydraulic oil, the box can moreover be made smaller, which is cost-effective at least from the point of view of manufacture.

The pumps 8, 17, 18, 20 are adapted for pumping in such a manner that hydraulic oil is pumped essentially continuously to and from the gearbox 5 and, respectively, the axles 2, 3.

The pump 20 for pumping hydraulic oil from the gearbox 5 is adapted to pump oil essentially continuously from a vessel, located in the gearbox, and arranged to collect the oil supplied to the gear wheels of the gearbox.

The vehicle consists of a transport machine. In this context, such vehicles and transport machines are exemplified by transports used transporting materials or objects, such as a truck, a wheel loader, an articulated or frame-steered vehicle that is more commonly known as a dumper, and vehicles for transporting people, for example, a bus.

The invention is not to be considered as being limited to the embodiment described above, but a number of further variants and modifications are possible while still being within the scope of the patent claims below.

According to one alternative to the embodiment described above, the brakes 35, 36 are cooled separately. In other words, the hydraulic oil is not pumped from the temperature regulating system to the wheel brakes.

According to another embodiment, the hydraulic arrangement is also adapted to provide the transfer gearbox of the vehicle with hydraulic oil from the container 7.

It is of course also within the scope of the invention for the temperature regulating system to have, in addition to container 7, one or more further containers for the hydraulic oil. In other words, the same oil is in such a case still used for all the components in the system.

What is claimed is:

1. A temperature regulating system for a vehicle, said temperature regulating system comprising:

an hydraulic arrangement (6) configured to provide components intended for rotation located in a gearbox (5) of a vehicle and in at least one axle of the vehicle with hydraulic oil from the same container (7); and at least one space for housing at least one of the components being adapted for a dry sump.

2. The temperature regulating system as recited in claim 1, wherein the hydraulic arrangement (6) further comprises means for spraying the hydraulic oil over the components and means for removing the oil from the space.

3. The temperature regulating system as recited in claim 2, wherein the oil removal means is adapted to remove the oil continuously from the space during operation of the vehicle so that substantially no amount of oil is left present in an inactive state in the space.

4. The temperature regulating system as recited in claim 1, wherein the hydraulic arrangement (6) comprises a first pump (8) for pumping oil from the container (7) to the gearbox (5) and to the vehicle axle.

5. The temperature regulating system as recited in claim 4, wherein each second pump (17, 18, 20) has a pump capacity of at least the same as the first pump (8) for supplying oil connected to the gearbox and to the axle.

6. The temperature regulating system as recited in claim 1, wherein the hydraulic arrangement (6) further comprises at least two second pumps (17, 18, 20) including one (20) configured for suction of oil from the gearbox (5) and another (17, 18) for suction of oil from the vehicle axle.

7. The temperature regulating system as recited in claim 1, wherein the container (7) is located apart from the space in which the rotating components forming part of the axle are arranged.

8. The temperature regulating system as recited in claim 1, wherein the container (7) is located apart from the space in which the rotating components forming part of the gearbox (5) are arranged.

9. The temperature regulating system as recited in claim 1, wherein the components intended for rotation located in the axles of the vehicle comprise on the one hand disks in a wet brake (35, 36) and on the other hand gear wheels in a gear (14, 15).

10. The temperature regulating system as recited in claim 1, further comprising:

an arrangement (22) for regulating the temperature of the oil in the hydraulic arrangement (6) via a heat exchanger unit (21).

11. The temperature regulating system as recited in claim 10, further comprising:

a sensor (28) for sensing the temperature of the oil and a control unit (29) connected to the sensor;

the temperature regulating arrangement being further adapted to cool or heat the oil depending sensed oil temperature.

12. The temperature regulating system as recited in claim 10, wherein the temperature regulating arrangement (22) is further adapted to cool the engine (4) of the vehicle.

13. The temperature regulating system as recited in claim 12, further comprising:

a sensor (31) connected to the control unit (29) for sensing the temperature of the coolant of the engine.

* * * * *